US010318333B2

(12) United States Patent
Tiwary et al.

(10) Patent No.: US 10,318,333 B2
(45) Date of Patent: Jun. 11, 2019

(54) OPTIMIZING ALLOCATION OF VIRTUAL MACHINES IN CLOUD COMPUTING ENVIRONMENT

(71) Applicant: SAP SE, Walldorf (DE)

(72) Inventors: Mayank Tiwary, Rourkela (IN); Sabyasachi Dhal, Orissa (IN)

(73) Assignee: SAP SE, Walldorf (DE)

( * ) Notice: Subject to any disclaimer, the term of this patent is extended or adjusted under 35 U.S.C. 154(b) by 135 days.

(21) Appl. No.: 15/635,202

(22) Filed: Jun. 28, 2017

(65) Prior Publication Data

US 2019/0004837 A1 Jan. 3, 2019

(51) Int. Cl.
*G06F 9/455* (2018.01)
*G06F 9/50* (2006.01)

(52) U.S. Cl.
CPC ........ *G06F 9/45558* (2013.01); *G06F 9/5011* (2013.01); *G06F 2009/4557* (2013.01); *G06F 2009/45595* (2013.01)

(58) Field of Classification Search
CPC ............... G06F 9/45558; G06F 9/5011; G06F 2009/4557; G06F 2009/45595
See application file for complete search history.

(56) References Cited

U.S. PATENT DOCUMENTS

| 8,825,550 | B2 | 9/2014 | Marr et al. |
|---|---|---|---|
| 9,405,593 | B2 | 8/2016 | McGrath et al. |
| 9,547,534 | B2 | 1/2017 | Dettori et al. |
| 2011/0078303 | A1 | 3/2011 | Li et al. |
| 2012/0331463 | A1* | 12/2012 | Orveillon ................. G06F 8/63 718/1 |
| 2013/0047158 | A1 | 2/2013 | Jadhav et al. |
| 2013/0111033 | A1* | 5/2013 | Mao ..................... G06F 9/5072 709/226 |
| 2013/0290957 | A1* | 10/2013 | Li ......................... G06F 9/5066 718/1 |
| 2014/0229945 | A1 | 8/2014 | Barkai et al. |
| 2014/0280488 | A1 | 9/2014 | Voit et al. |
| 2014/0359113 | A1 | 12/2014 | Krebs et al. |
| 2014/0380307 | A1* | 12/2014 | Zhu ..................... G06F 9/45533 718/1 |
| 2015/0006730 | A1 | 1/2015 | Helfman et al. |
| 2015/0363219 | A1 | 12/2015 | Kasturi et al. |
| 2016/0094650 | A1* | 3/2016 | Garcia de Rio ........ H04L 47/78 709/226 |
| 2016/0328273 | A1 | 11/2016 | Molka et al. |

(Continued)

*Primary Examiner* — Adam Lee
(74) *Attorney, Agent, or Firm* — Buckley, Maschoff & Talwalkar LLC

(57) ABSTRACT

Methods and system are disclosed that optimize an allocation of virtual machines or instances of virtual machines or computing resources. In one aspect, a software defined network includes a front-end query classifier to monitor user traffic (e.g. requests or queries for executing operations) generated from multiple virtual machines (e.g., tenants). The monitored queries may be classified into multiple levels or categories (e.g., L1, L2, L3, etc.) by a back-end query classifier. The classified queries are clustered by a query-clustering engine based on a time stamp information associated with the queries. A virtual machine optimizer may optimize an allocation of virtual machines based on a computation that includes a combination of density of clustered queries and weights assigned to the queries.

20 Claims, 9 Drawing Sheets

(56) References Cited

U.S. PATENT DOCUMENTS

| | | |
|---|---|---|
| 2016/0330136 A1 | 11/2016 | Saha et al. |
| 2016/0350146 A1* | 12/2016 | Udupi ................. G06F 9/45558 |
| 2016/0359668 A1* | 12/2016 | Udupi ................. G06F 9/45558 |
| 2017/0012903 A1* | 1/2017 | Matzek ............... G06F 9/45558 |

* cited by examiner

| USER – ID 702 | L1 – QUERY 704 | L2 – QUERY 706 | L3 – QUERY 708 | TENANT – PUBLIC IP 710 | USER – PUBLIC IP 712 |
|---|---|---|---|---|---|
| | | | | | |
| | | | | | |
| | | | | | |
| | | | | | |
| | | | | | |

FIG. 7

OPTIMIZING ALLOCATION OF VIRTUAL MACHINES IN CLOUD COMPUTING ENVIRONMENT

BACKGROUND

Typically, real world processes and applications execute on integrated heterogeneous systems. For example, the processes, as implemented on systems, applications, etc., may provide on demand functionalities via online platforms (e.g., over a network using the Internet, such as World Wide Web). Such provisioning of on demand systems may employ reconfiguration mechanisms for allocating computing resources, which may have drawbacks such as, being complex, inaccurate, inefficient, have multiple complex points of communication, inflexible and not scalable, thereby adding to redundancy and increasing costs. Further such reconfiguration mechanisms may reduce application performance and may not be able to cope with real-time requirements for allocation of computing resources. Therefore, providing a mechanism that dynamically optimizes the allocation computing resources, such that a software defined system is reconfigurable in real-time, by overcoming the above drawbacks, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

FIG. 7 is an illustration of a data structure (e.g., a query table) including information related to queries, according to an embodiment.

DETAILED DESCRIPTION

Figure 1:
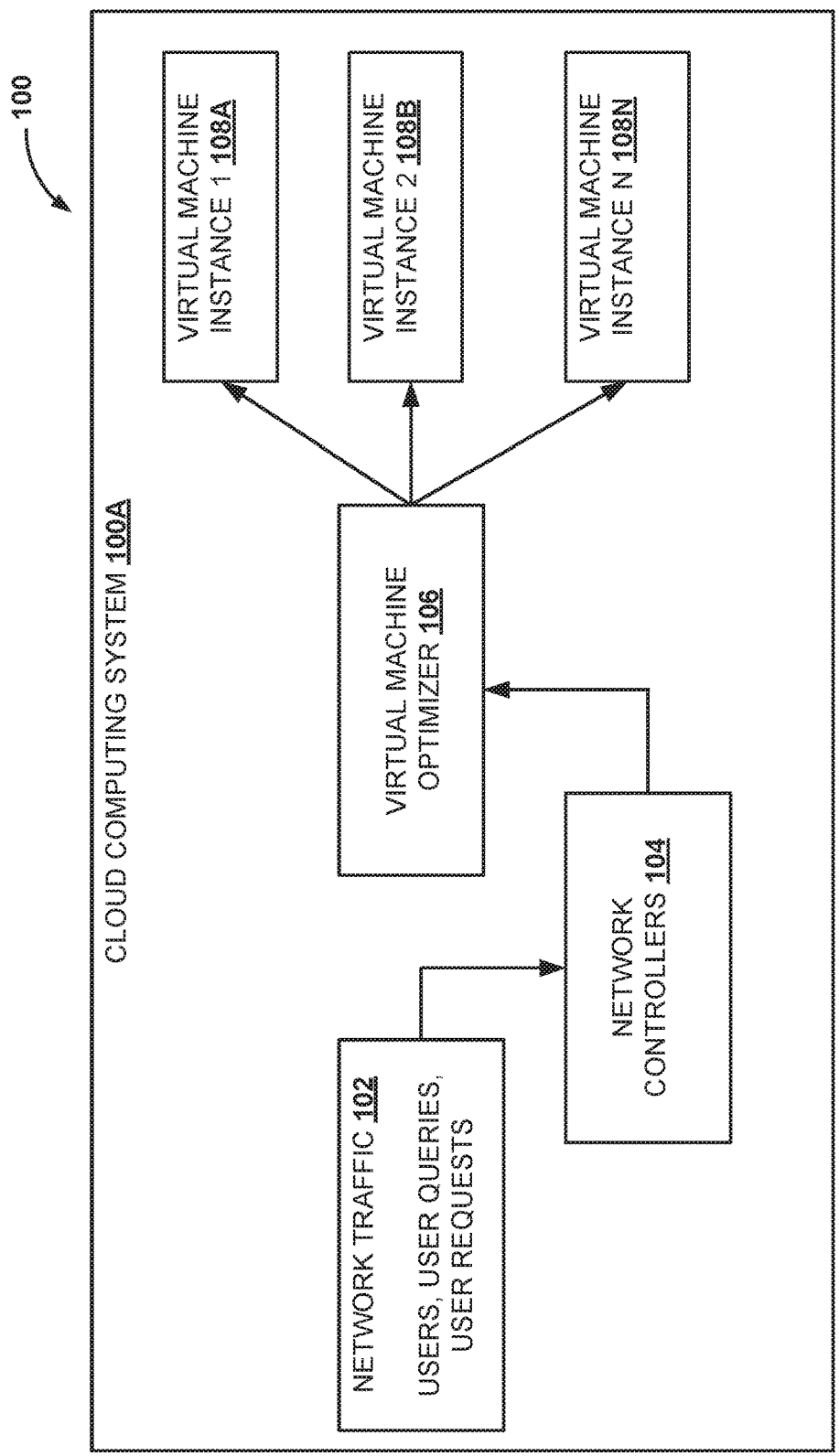
FIG. 1 is a block diagram illustrating an environment to dynamically optimize an allocation of virtual machines, according to an embodiment.

Embodiments of techniques related to optimizing allocation of virtual machines in cloud computing environment are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a feature, structure, or characteristic described in connection with the embodiment is included in at least one of the one or more embodiments. Thus, the appearances of these phrases in various places throughout this specification are not necessarily all referring to the same embodiment. Furthermore, the features, structures, or characteristics may be combined in any suitable manner in one or more embodiments.

Dynamic allocation of computing resources or virtual machines in a cloud computing environment plays a significant role. The mechanisms for allocation of such virtual machines may dynamically adapt to demand for computing resources and may be based on a number of factors. For example, such factors may include number of users logged into systems, applications, etc., on the cloud computing environment, number of requests or queries generated by the users for executing operations or functionalities, etc. In addition to the above factors, the dynamic allocation of allocation of computing resources or virtual machines may be modified (e.g., scaled-up or scaled-down) based on network traffic, dynamic behavior of user requests for executing operations, dynamically triggering queries in real-time, etc.

The prediction of network traffic may be based on historic data (e.g., network traffic, user queries, user behavior of logging onto cloud computing environment, logging off the cloud computing environment, etc.) associated with the cloud computing environment. Such predictions may be generated by cooperatively working with network controllers (local area network (LAN) controller, wide area network (WAN) controller, etc.) and other systems, applications, or software components deployed in the cloud computing system. In an embodiment, the above network controllers, components, etc., may cooperatively work to monitor the user behavior, the queries generated from the users, etc., and may report such monitored information or data to a virtual machine optimizer. The virtual machine optimizer may analyze the monitored information or data and optimize the allocation of the computing resources or virtual machines.

In an embodiment, the terms software components or components, software routines or routines, software models or models, software engines or engines, software scripts or scripts, layers etc., are employed interchangeably throughout the subject specification, unless context warrants particular distinction(s) among the terms depending on implementation. The implementation primarily involves executing computer readable code such as, a sequence of instructions, by a processor of a computing device (e.g., a special purpose computer, a general-purpose computer, mobile device, etc. an integrated environment. The computing device may execute as the special purpose computer when the memory in the computing device stores instructions that are executed by the processor, provide specific operations or functionalities (contextually the cooperative and/or independent functioning of front-end query classifier, back-end query classifier, virtual machine optimizer, controllers, etc., may facilitate the functioning of the computing device as the special purpose computer). For example, the memory may store instructions not limited to monitoring users logging on and logging off, network traffic generated by the users, classifying queries triggered by the users, clustering the classified queries, optimizing an allocation of virtual machine (VM) or virtual machine instances or computing resources in a distributed computing environment (e.g., cloud computing environment), etc. The cooperative execution of the above operations or functionalities may therefore improve the functionality of the special purpose computer. The execution of specific operations or functionalities, either individually or cooperatively, may effectively optimize the allocation of or VMs or VM instances or computing resources, thereby rendering the computing device perform operations as the special purpose computer. The above models, software components, software routines, etc., may be reused based on definition and implementation.

FIG. 1 is a block diagram illustrating environment 100 to dynamically optimize an allocation of virtual machines, according to an embodiment. FIG. 1 shows an environment 100 including a software defined network (SDN) in cloud computing system 100A. The cloud computing system 100A may include multiple tenants (not shown), multiple controllers (not shown), for example, SDN LAN controller (not shown), SDN WAN controller (not shown), data center network controller (not shown), virtual machine optimizer 104, etc. The network traffic 102 may correspond to information or data associated with the users logged onto the tenants, requests triggered (e.g., user queries, user requests, etc.) for execution of operations or functionalities on the cloud computing system. The network traffic 102 may be monitored by network controllers 104 (e.g., SDN LAN controller, SDN WAN controller, etc.). In an embodiment, components such as, query classifiers (e.g., front-end query classifiers, back-end query classifiers, etc.) may monitor and classify the queries generated by the users.

In an embodiment, the SDN LAN controller, the SDN WAN controller, data center network controller, etc., may be collectively or individually, also referred to as network controllers 104. For example, the SDN LAN controller may be deployed and operate on a user or customer site (e.g., tenants), the SDN WAN controller may be deployed and operate on Internet layer, via which the users establish connections with cloud computing system 100A. In an embodiment, network controllers 104, the query classifiers and virtual machine optimizer 106 may cooperatively work in cloud computing system 100A to optimize an allocation of virtual machines or instances of virtual machines (e.g., virtual machine instance 1 108A, virtual machine instance 2 108B, ... virtual machine instance N 108N) and/or computing resources (e.g., virtual central processing units (VCPUs), memory, processors, etc.)

Figure 2:
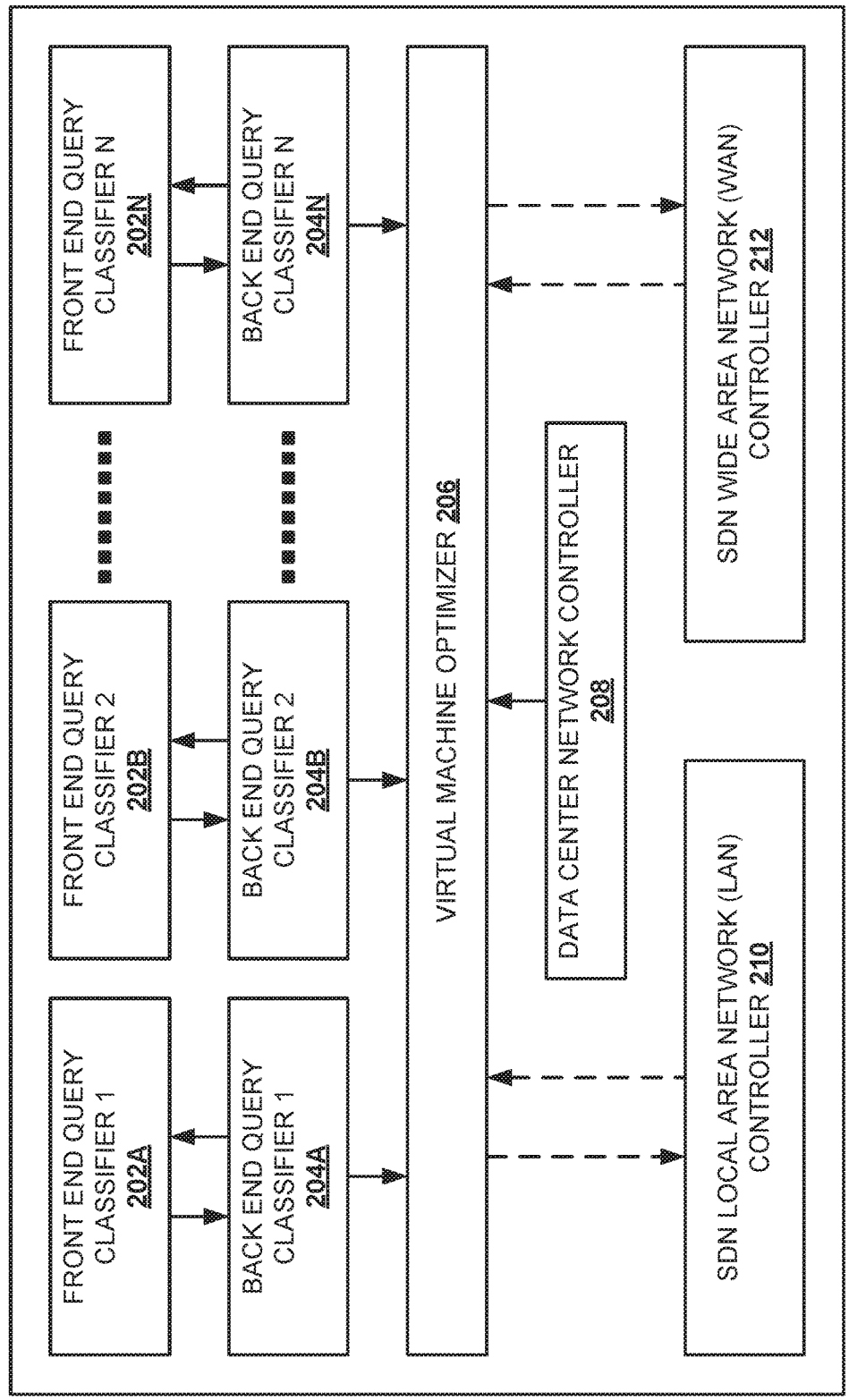
FIG. 2 shows a computer system landscape to optimize an allocation of virtual machines in a software defined network (SDN), according to an embodiment.

FIG. 2 shows a computer system landscape 200 to optimize an allocation of virtual machines in a SDN, according to an embodiment. FIG. 2 shows a computer system landscape 200 to dynamically optimize an allocation of virtual machines in a SDN. In an embodiment, computer system landscape 200 may include software components that may work independently or cooperatively with each other, to provide execution of specific operations or functionalities. In an embodiment, a tenant may represent an application or system in a distributed computing environment (e.g., cloud computing environment). In an embodiment, multiple tenants may be deployed in the cloud computing environment, onto which the user may log on and execute specific functionalities or operations. FIG. 2 shows components, such as, front-end query classifiers (202A, 202B, ... 202N), back-end query classifiers (204A, 204B, ... 204N), virtual machine optimizer 206, data center network controller 208, SDN LAN controller 210, SDN WAN controller 212, etc. The components (e.g., 202A, 202B ... 202N; 204A, 204B, ... 204N; 206, 208, 210, 212, etc.) may execute independently to provide specific functionalities or work cooperatively to provide functionalities, such as, optimizing the allocation of virtual machines (e.g., computing resources) in the SDN. At least one tenant in the cloud computing environment may cooperatively work with front-end query classifier (e.g., 202A) and back-end query classifier (e.g., 204A). The functional efficacy with reference to one embodiment of front-end query classifier (e.g., 202A) and back-end query classifier (e.g., 204A) is described and applicable to multiple front-end query classifiers (e.g., 202A, 202B, ... 202N) and back-end query classifiers (e.g., 204A, 204B, ... 204N) as shown in FIG. 2. In an embodiment, the periodic execution of front-end query classifier (e.g., 202A) may monitor enterprise resource planning (ERP) queries (also referred to as queries) generated or triggered by the users of the tenants, while the execution of back-end query classifier (e.g., 204A) on the tenants may classify the queries triggered from the users. In an embodiment, front-end query classifier (e.g., 202A) may be executed as a software script (e.g., sequence of instructions executed by a processor) cooperatively working with the web browsers on the tenants.

In an embodiment, the users may use a web application that may work in cooperation with front-end query classifier (e.g., 202A). When the user makes a request or triggers a query, the front-end query classifier sends it to a particular port of the web application machine, such as a transmission control protocol (TCP) port. The port may indicate a type of the query. For example, the front-end query classifier may send the queries to a first port of the web application machine; a second type of query message to a second port of the web application machine, and so on In an embodiment, the front-end query classifier may periodically monitor the backend query table and forward the query to the TCP ports based on the entries in the query table.).

In an embodiment, the network controllers (e.g., 208, 210, 212) may be configured to modify network nodes transporting query messages and prioritize the packets making up the query message (herein packets making up a query message are also referred to herein as query message packets). For example, a tenant may be configured to assign query message packets to one queue of a set of queues. The queue to which a query message is assigned may be determined, for example, by the query type (e.g., classified as L1, L2, L3, etc., by the backend query classifier) (e.g., indicated by the port to which the query message is directed). In an embodiment, SDN WAN controller may configure and execute control requests for the network appliances (e.g., WAN routers, routers, etc.) of the WAN to select network paths for query message packets, for example, based on query type (e.g., indicated by the port to which the query message is directed, the queue to which the tenant LAN assigned query network packets. etc.) The data center controller may configure network appliances of the data center LAN to direct query message packets, for example, based on query type, user, tenant, etc. In an embodiment, when a user requests or triggers a query, the front-end query classifier executing at the user's computing device may generate a query message including the query and sends the query message to the web application machine running in data center at specific TCP port. For example, the front-end query classifier may include a script or other interpreted language instructions executed through a web browser on the user computing device.

In an embodiment, back-end query classifier (e.g., 204A) may classify the queries triggered by the end users based on computational efficacies of the queries. The computational efficacies may correspond to results or output generated by the execution of the queries. For example, when a supplier invoice is created or generated, the invoice may include prices corresponding to goods, information related to service receipts, inbound delivery documents, etc. The computational efficacies may be computed by back-end query classifier (e.g., 204A) based on the CPU utilization level when processing queries or requests such as the above supplier invoice. The back-end query classifier (e.g., 204A) may categorize the queries or classify the queries into multiple levels. For example, such categories or classification may be represented by Level 1 (L1), Level 2, (L2), Level 3 (L3), etc. For example, L1 classified query may represent highest level of computational efficacy (e.g., highest level of computational intensiveness or highest level of CPU utilization of about more than 90%), L2 classified query may represent lower than the highest level of computational efficacy (e.g., lower than the highest level of computational intensiveness or lower than the highest level of CPU utilization of about more than 80% but less than 90%) and so on, in descending order of computational efficacy. In an embodiment, the queries may be classified based on transmission control protocol (TCP) port addresses via which the queries may be triggered and processed. For example, the components SDN WAN controller 212 may provide virtualization of internet layer (e.g., SDN application represented by SDNA1 may be deployed on local area network 1 LAN1 and SDNA1 may cooperatively work on local area network 2 (LAN2) with abstraction, thereby providing virtualization of internet layer using WAN devices such as routers), and SDN LAN controller 210 may provide virtualization of data link layer (e.g., SDN application represented by SDNA1 may be deployed on cloud computing network 1 CCN1 and SDNA1 may cooperatively work on cloud computing network 2 (CCN2) with abstraction, thereby providing virtualization of internet layer using LAN devices such as network switches) and both controllers (e.g., 210 and 212) may be configured to identify TCP port addresses associated with the queries. In an embodiment, based on the computational efficacies of the queries, the back-end query classifier may assign weights to the queries. The back-end query classifier (e.g., 204A) may generate a query table (e.g., also referred to as a user query table) that may store information associated with the queries (e.g., classification information, TCP port addresses, weights of the queries, etc.). In an embodiment, computational efficacy and weights may be assigned to the queries based on the number of attached documents, the number of references, the total number of attachments, whether the query calls for a mass data run object, etc.

In an embodiment, the weights assigned to the queries may be modified based on the computational efficacy. When the weights assigned to the queries are modified, front-end query classifier (e.g., 202A) monitoring such changes may access and update a query table (e.g., as shown in FIG. 7) to include or reflect such modifications. The front-end query classifier (e.g., 202A) may be configured to periodically monitor the queries triggered from the users and update (e.g., add, delete, modify, etc., data corresponding to the columns as shown in FIG. 7) the query table without interrupting the monitoring operations. In an embodiment, the information in the query table may be replicated or propagated to other components, such as, virtual machine optimizer 206, data center network controller 208, SDN LAN controller 210, SDN WAN controller 212, etc. The back-end query classifier (e.g., 204A) may be configured to cooperatively work with virtual machine optimizer 206, SDN LAN controller 210, SDN WAN controller 212, etc., to update the modifications or changes in the query table and propagate such modifications to the above components (e.g., 206, 210, 212, etc.).

Figure 3:
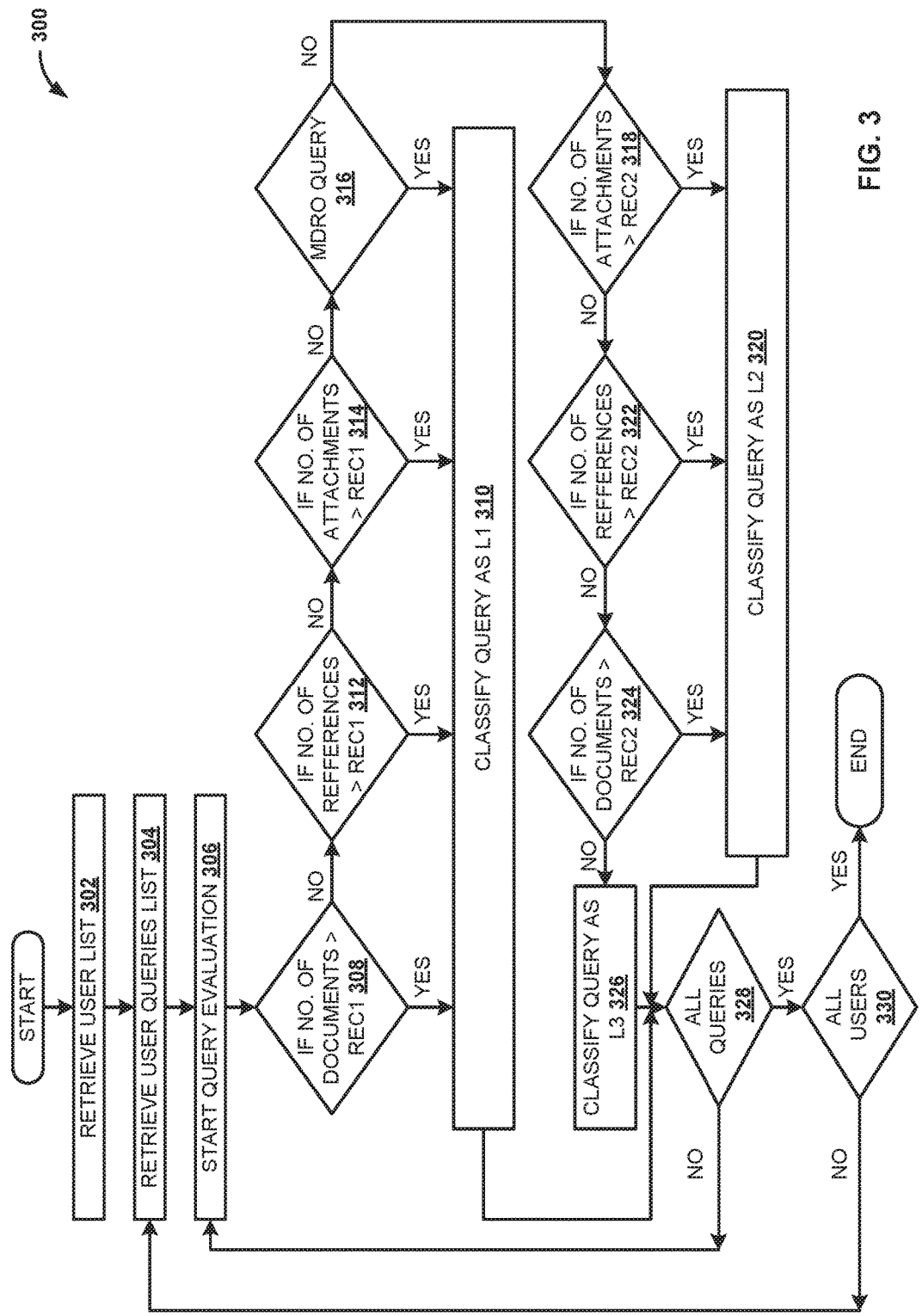
FIG. 3 is a flow diagram illustrating a process to classify queries, according to an embodiment.

FIG. 3 is a flow diagram illustrating process 300 to classify queries, according to an embodiment. In an embodiment, back-end classifier (e.g., 204A of FIG. 2) may classify the queries monitored by front-end classifier (e.g., 202A of FIG. 2). The back-end classifier may cooperatively work with a component user access validation (not shown) (herein may be implemented as user access validation engine) to retrieve a list of users (e.g., retrieve user list 302) and an associated list of queries triggered by the users (e.g., retrieve user queries list 304). For example, upon retrieving the list of users (e.g., user A, user B, user C, etc.), the user access validation component may validate user, for example, user A and the back-end query classifier may retrieve the list of queries triggered by user A. In an embodiment, upon retrieving the list of queries triggered by user A, the back-end classifier may execute an operation of evaluating the queries (e.g., start query evaluation 306) triggered by users. For instance, evaluating the query may include determining the type of query, for example, based on multiple attributes, such as, a number of documents attached to the query (e.g., if no. of document >REC1 308), a number of references to the query (e.g., if no. of references>REC1 312), a number of attachments to the query (e.g., if no. of attachments>REC1 314), in response to an execution of the query, determining a number of outputs generated by the query, determining whether the query is a mass data run object (MDRO) query (e.g., MDRO query 316), etc. In an embodiment, a MDRO query may correspond to a set of queries that may be combined and executed as a single batch of queries. The MDRO query processing may be useful for bulk processing of, for example, inventory, data pattern queries, purchase requests, purchase orders, customer invoicing, supplier invoicing, etc. In an embodiment, the above attributes may be semantically identical when data and/or attributes associated with the multiple queries are similar.

In an embodiment, the back-end query classifier may classify the queries based on decision logic, such as, based on a determination whether the attributes associated with the queries fall within or exceed a predefined threshold value (also referred to as recommended threshold values, e.g., first recommended threshold value, second recommended threshold value, etc.). For example, (1) when one or more of the above attributes associated with the query exceeds a recommended threshold value (e.g., REC 1 or first recommended threshold value), the query may be classified as L1 query 310 (e.g., YES from 308, 312, 314, 316, classify query as L1 310); (2) when the response of evaluation of one or more of the above attributes (e.g., YES from 318, 322, 324) associated with the query exceeds a recommended threshold value (e.g., REC 2 or second recommended threshold value), the query may be classified as L2 query (e.g., shown as classify query as L2 320); (3) when one or more of the above attributes associated with the query neither exceeds nor falls within the recommended threshold values (e.g., REC 1, REC 2, etc.) (e.g., NO from 324), the query may be classified as L3 query (e.g., classify query as L3 326). For example, suppose a query includes supplier invoice associated with goods, service receipts, inbound deliveries, credit memos, etc., includes above attributes with a value more than first recommended threshold value of 100 (e.g., REC1), then the query may be classified as L1 query. For example, suppose the supplier invoice associated with goods, service receipts, inbound deliveries, credit memos, etc., includes above attributes with a value more than second recommended threshold value of 80 (e.g., REC2; between 80 and 100), then the query may be classified as L2 query; classified as L3 query when the above attribute values are less than second recommended threshold value 80 and so on. In an embodiment, the recommended threshold value may be configured or modified by a system administrator or an end user based on historical data associated with the users and the queries. The back-end query classifier may evaluate to check if the entire set of queries associated with retrieved user queries list are evaluated (e.g., all queries 328) for all users (e.g., all users 330) and based on the response (e.g., NO from 328 and 330), may loop back to evaluate the queries, as explained above.

In an embodiment, back-end query classifier (e.g., 204A) may determine if the query includes a predetermined number of documents attached by comparing it with threshold values. In an embodiment, the back-end query classifier (e.g., 204A) may determine if the number of documents attached to the query is greater than first recommended threshold value for the number of documents. For example, a document may be attached to a query when the document is processed with the query. The query may include an attached invoice, bill, etc. to be processed. The attached invoice, bill, or other document may be an attached document counted at operation. If the number of attached documents exceeds the first recommended threshold value, back-end query classifier (e.g., 204A) may classify the query as L1 query. In another embodiment, the query may be classified based on cumulative counting of the number of documents and/or number of attachments and/or number of references.

In an embodiment, when the number of documents attached to the query is below the first recommended threshold value, back-end query classifier (e.g., 204A) may then determine, if the number of references in the query exceeds the recommended threshold value. If the determination is true, then the query is classified as L1 query. If the determination is not true, back-end query classifier (e.g., 204A) may determine the number of attachments for the query exceeds recommended threshold value. For example, the attachments to the query may include, for example, attached documents as well as other attachments, such as photographs, video, etc. If the number of attachments is greater than the recommended threshold value, then the query is classified as L1 query. If determination is not true, the back-end query classifier (e.g., 204A) may determine if the query requests a mass data run object. In an embodiment, a mass data run object may correspond to grouping of multiple queries into a single batch query.

For example, the backend query classifier may determine if the number of documents attached to the query exceeds the second recommended threshold value. The second recommended threshold value may be less than the first recommended threshold value. If the determination is true, the query may be classified as L2 query. If determination is not true, the backend query classifier may determine whether the number of references in the query is greater than second recommended threshold value, which may be less than the first recommended threshold value. If determination is true, then the query is classified as L2 query. If determination is not true, then the backend query classifier may determine, whether the number of attachments to the query exceeds second recommended threshold value, which may be less than the first recommended threshold value. If true, the query is classified as L2 query. If not true, then the query is classified as L3 query.

Figure 4:
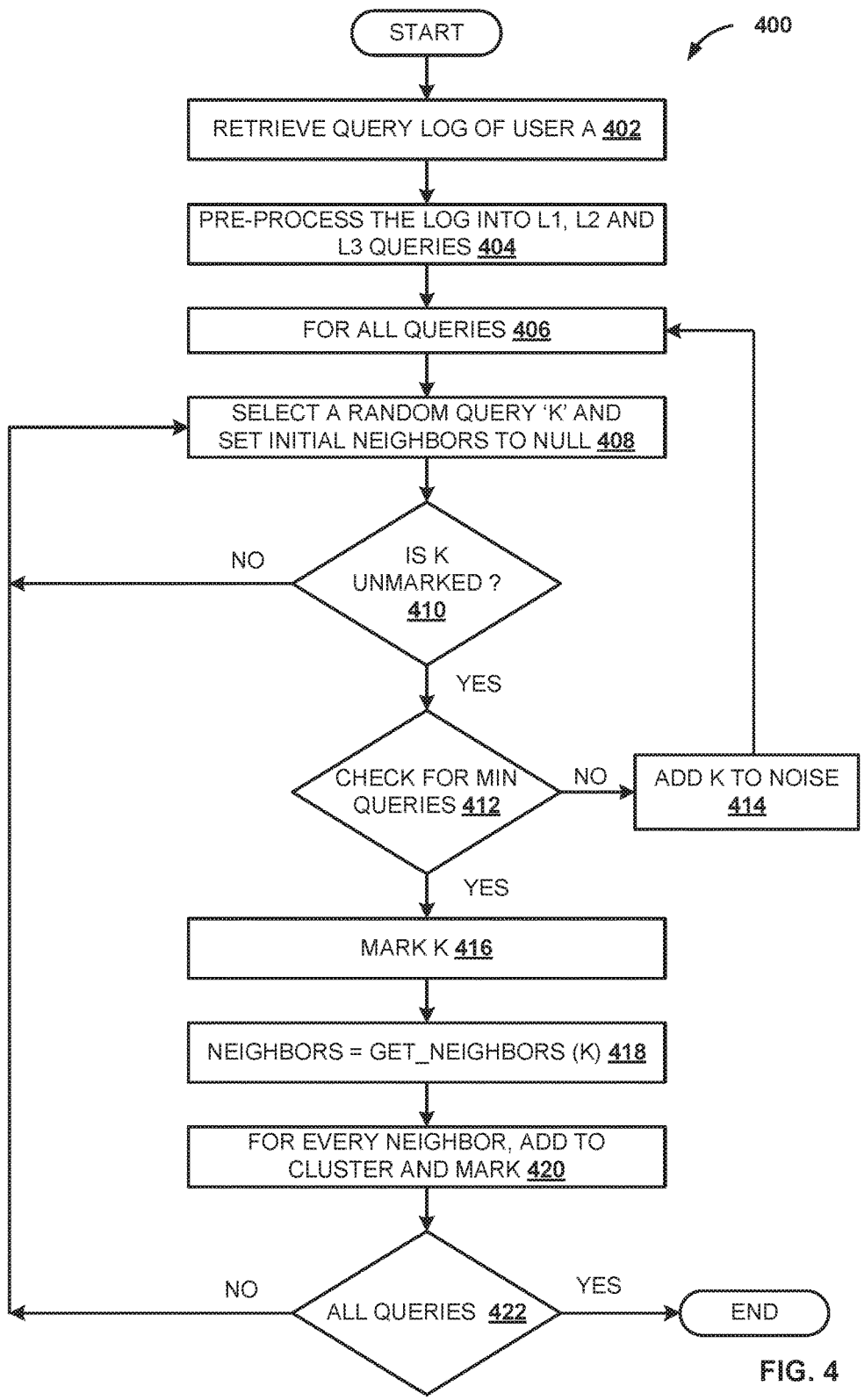
FIG. 4 is a flow diagram illustrating a process for clustering queries, according to an embodiment.

FIG. 4 is a flow diagram illustrating process 400 for clustering queries, according to an embodiment. In an embodiment, component query clustering (e.g., 204A: implemented as a query clustering engine) may cluster the queries classified (e.g, queries classified, as explained in FIG. 3). The query clustering engine may periodically be executed on the tenants that may cluster the queries based on a decision logic. For example, the decision logic may include determining a density of the queries in time domain. In an embodiment, the density of queries may correspond to a collection of queries that may be triggered at specific instances of time in the time domain. The clustered queries may be associated with minimum time e.g., lower bound time or start time when the queries are triggered) and maximum time (e.g., upper bound time or end time when the queries are triggered), that may define boundaries between the clustered queries. Initially, the query clustering engine may retrieve information log of queries triggered by users from the query table (e.g., retrieve query log of user A 402). As explained previously, the query table may store information related to the classification of queries and the queries may be pre-processed (e.g., preprocess the log into L1, L2 and L3 queries 404) to determine the classification of the queries. In an embodiment, all the queries in the query table may be pre-processed (e.g., for all queries 406) to determine the classification of the queries.

In an embodiment, the query clustering engine may initialize an execution of clustering the queries based on inputs, such as, a minimum number of queries (min_queries), minimum time (min_time), etc. For example, the attribute min_queries may represent a minimum number of queries that may be clustered and the attribute min_time may represent a minimum time gap between the queries. The cluster size may be equal to total number of queries in the cluster and the min_queries may represent a threshold value. The attribute min_time may represent the radius of the cluster in time domain. For example, suppose 25 queries are triggered between time 9.00 am and 11.00 am and the cluster size (e.g., min_queries) is 20, the query clustering engine may select only 20 queries from the 25 queries and cluster the queries. The queries may be clustered such that the queries are triggered within a time gap of, for example, 10 minutes. This time gap may represent the attribute min_time. The remaining 5 queries may be grouped into subsequent clusters, depending on the time stamp information associated with the queries. In an embodiment, the mechanism for clustering may start by randomly selecting the query from the query table, and setting or assigning the neighbors of the selected query with a value NULL (e.g., select a random query 'k' and set initial neighbors to null 408). The query is checked if it is marked or not (e.g., is unmarked 410). If is not unmarked (or if 'k' is marked) (e.g., NO from 410), another query from the query table is randomly selected. If the query is not marked (e.g., YES from 410), then the query is evaluated based on conditions related to min_queries and min_time (e.g., check for min queries 412). In an embodiment, marking of query may correspond to the query evaluation. While the evaluation of the query is unsuccessful (e.g., the query does not meet the conditions related to min_queries and min_time; NO from 412), the query is added as noise (e.g., add 'k' to noise 414). When the evaluation of the query is successful (e.g., YES from 412), the query is marked (e.g., mark 'k' 416) and the neighboring values are initialized (e.g., neighbors=get_neighbors (k) 418). Subsequently, the queries from the query table are randomly selected and evaluated, as explained above and for every query and its neighbor marked is added to the cluster (e.g., for every neighbor, add to cluster and mark 420). In an embodiment, the clustering engine processes all the queries (e.g., all queries 422; when NO in 422, process loops back to 408) in the query table, performs evaluation of the queries and clusters the queries, as explained previously. The values of min_queries and min_time may be configured by the administrator or end user. In an embodiment, when the query clustering engine fails to cluster the queries, the queries classified as L1 and L2 may be merged. For example, the query clustering engine fails to cluster the queries when the attributes min_time and min_queries are not optimal for initiating the query clustering mechanism. The query clustering engine may perform the above explained evaluation on the merged set of queries and may cluster the queries.

Figure 5:
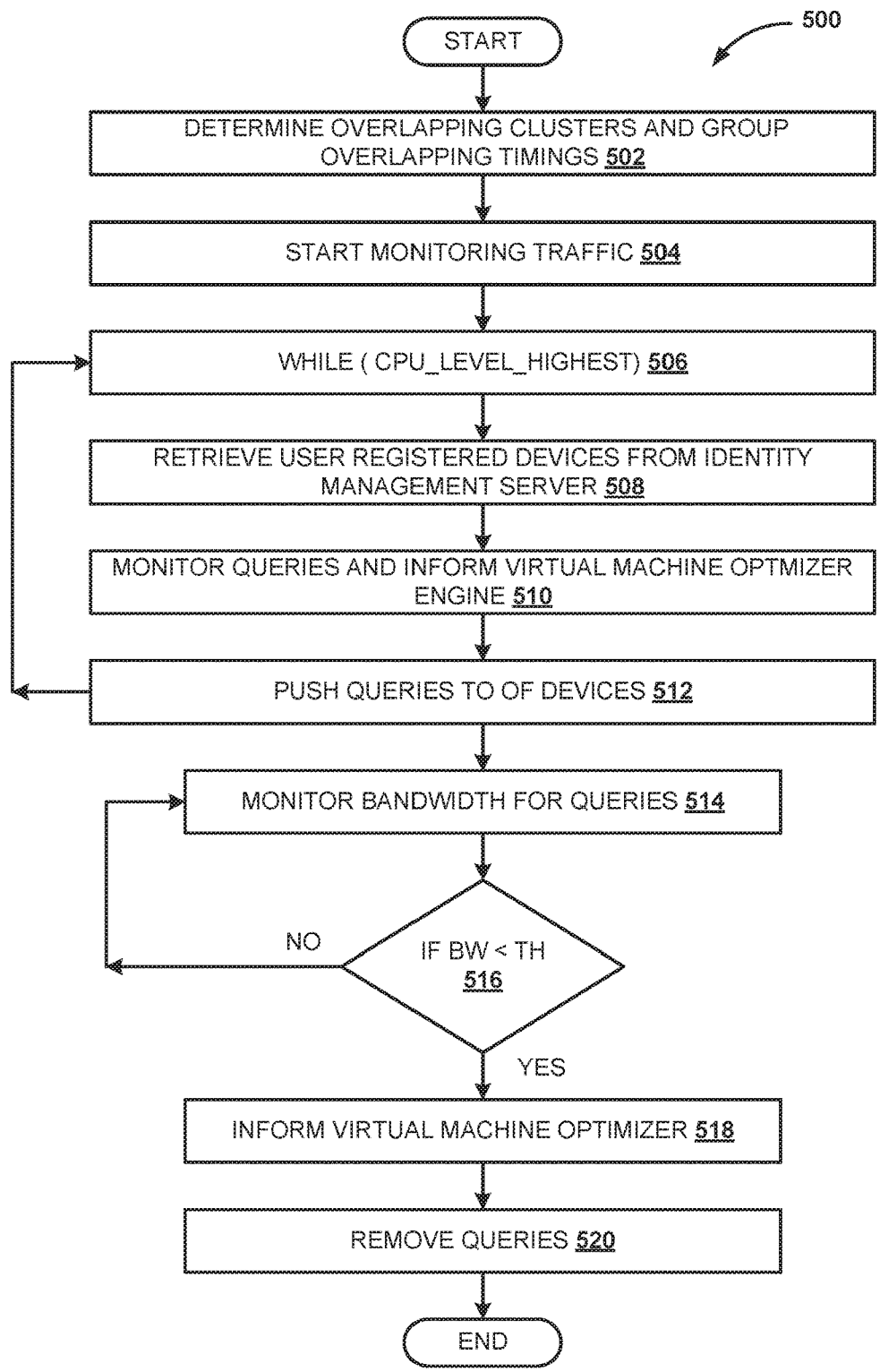
FIG. 5 is a flow diagram illustrating a process to predict network traffic, according to an embodiment.

FIG. 5 is a flow diagram illustrating process 500 to predict network traffic, according to an embodiment. FIG. 5 shows a process to predict network traffic (e.g., no, of users logging into the cloud computing environment, number of users logging off from the cloud computing environment, queries triggered by users via tenants, etc.). In an embodiment, the network traffic may be monitored by the SDN WAN controller and the SDN LAN controller, which may include tracking the users logging into the tenants (e.g., by observing or determining the packet_in from the network switches, routers, etc.), logging off the tenants (e.g., by observing or determining flow_delete from the switches to routers), the queries triggered by the users on the cloud computing environment, etc. In an embodiment, the network traffic may be monitored in real-time (also referred to as user traffic statistics) may be communicated or reported back to the virtual machine optimizer engine. In an embodiment, a network traffic prediction component (e.g., implemented as a network traffic prediction engine) may cooperatively work with the SDN LAN controller and the SDN WAN controller to predict the network traffic (or VM traffic load), based on the result of the monitoring.

In an embodiment, the information related to time domain associated with the clustered queries may be retrieved (e.g., such information may be stored in data structures, such as tables, flat files, etc.) and an overlap in time (e.g., based on time-stamp) between the clustered queries may be determined. Based on the determined overlap, the cluster of queries may be grouped into overlapping clusters by the network traffic prediction engine (e.g., determine overlapping clusters and group overlapping timings 502). For example, the clustered queries may be overlapping, when an end time of a first cluster of queries overlaps with a start time of a second cluster of queries, when the first cluster of queries and the second cluster of queries are contiguous. For example, if cluster #1 upper bound or end time is 11.00 am and cluster #2 lower bound or start time is 10.30 am, then cluster #1 and cluster #2 may be merged. The minimum time and maximum time may be determined by the query clustering component and based on the above information, the network controller may monitor the end users. The controllers may monitor the users (e.g., start monitoring traffic 504). In an embodiment, the controllers may continue monitoring the network traffic, while the CPU utilization level of the tenant is at a highest level (e.g., while (CPU_LEVEL_HIGHEST) 506; CPU utilization level at or more than 90% may correspond a highest level). In an embodiment, the controllers may retrieve information related to user devices, for example, the user devices MAC addresses, by communicating with an identity management server (e.g., retrieve user registered devices from identity management server 508). In another embodiment, an identity management server may store information related the users and registered devices used by the users. In an absence of the identity management server, the information related to the users and the registered devices may be entered manually by the administrator or the end user into the controllers. In an embodiment, the controllers may monitor the user traffic statistics including the queries triggered by the users and communicate this monitored information to the virtual machine optimizer engine (e.g., monitor queries and inform virtual machine optimizer engine 510).

In an embodiment, when users log into a tenant for a first time, (such that the controllers may store information related to the tenants in the query table), a packet_in (e.g., packet_in may represent a control request to the controller from a router or a network switch when a user attempts to access the tenant or application in the network) is generated and this packet_in is sent from the Open Flow (OF) device to the controller (e.g., SDN LAN controller or SDN WAN controller). In an embodiment, an open flow device may correspond to a network switch or a hardware device that forwards packets in the SDN. In SDN, the data plane (e.g., packet forwarding) is decoupled from the control plane (e.g., high level routing). The controllers may monitor users using packet_in and using this information, the network prediction engine may perform network traffic prediction. In an embodiment, when the queries are classified as L1 queries, the controllers may synchronously communicate with the virtual machine optimizer engine and wait for a response from the controllers, before forwarding the packet_out (e.g., push queries to OF Devices 512) (e.g., packet_out is a control response from the controller to the switch or router in response to the packet_in). When the queries are classified as L2 or L3, the controller may not wait for the response from the virtual machine optimizer engine and may forward the packet_out asynchronously.

In an embodiment, when the queries are classified as L2 and L3 queries, the virtual machine optimizer engine may synchronously communicate with the controller, before reconfiguring the tenant. The network traffic predictor engine may predict user traffic based on monitored bandwidth for the queries (e.g., monitor bandwidth for queries 514). In an embodiment, the controller may monitor the change in bandwidth (e.g., increase in bandwidth or decrease in bandwidth) (by sending OFSTATS_REQUEST packets for specific intervals of time to the Open Flow device and the difference in OFSTATS_REPLY from the Open Flow device may be measured) for queries. In an embodiment, the controller may send a OFSTATS_REQUEST packet to the switch or router to determine or observe the network traffic statistics, which may be used to compute the bandwidth. The switch or router may respond or reply with a OFSTATS_REPLY. When the bandwidth is low (e.g., 0 Mbps) than a threshold value, the controllers may communicate such information to the virtual machine optimizer engine (e.g., if BW<TH 516, inform virtual machine optimizer 518), and the controllers may remove the query entries e.g., remove queries 520) from the OF device using FLOW_MOD packets.

In an embodiment, each time a user connects to the SDN, and initiates a first request to access the URL, or initiates a request or triggers a query to execute an operation, the switch or router sends a packet_in to the controller to execute the requested operation. The controller responds with a packet_out and a flow_add that may direct or forward the packets to a gateway device. The flow_add adds a flow entry to the switch or router, thereby preventing duplication or resending the packet_in to the controller, when subsequent requests are triggered. For example, suppose that there are 3 users accessing the tenant on VM in the cloud computing environment and each user triggers a set of queries to execute a request or an operation. Consider user 1 has triggered queries {x_1, z_3, z_4}; user 2 has triggered queries {y_1, z_1, z_2}; and user 3 has triggered queries {x_2, y_2, z_5}. As explained previously with reference to back-end query classifier 'x_i' (e.g., x_1, x_2) may be classified as L1 queries; (e.g., 'y_i' (e.g., y_1, y_2) may be classified as L2 queries and 'z_i' (e.g., z_1, z_2, z_3, z_4, z_5) may be classified as L3 queries. Consider that L1 queries are triggered via TCP address 2000; L2 queries are triggered via TCP address 3000 and L3 queries triggered via TCP address 4000. In an embodiment, the TCP port address via which the queries are triggered for all users (e.g., user 1, user 2 and user 3) may be same. The controller may store this information as 9 flow entries on all the network devices in LAN and WAN. For example, the flow entries may be represented as follows:

a. source addr-user 1; destn addr-ERP VM; port-2000; queue-1; action {forward via physical port 10}
   b. source addr-user 1; destn addr-ERP VM; port-3000; queue-2; action-{forward via physical port 10}
   c. source addr-user 1; destn addr-ERP VM; port-4000; queue-3; action-{forward via physical port 10}
   d. source addr-user 2; destn addr-ERP VM; port-2000; queue-1; action-{forward via physical port 10}
   e. source addr-user 2; destn addr-ERP VM; port-3000; queue-2; action-{forward via physical port 10}
   f. source addr-user 2; destn addr-ERP VM; port-4000; queue-3; action-{forward via physical port 10}
   g. source addr-user 3; destn addr-ERP VM; port-2000; queue-1; action-{forward via physical port 10}
   h. source addr-user 3; destn addr-ERP VM; port-3000; queue-2; action-{forward via physical port 10}
   i. source addr-user 3; destn addr-ERP VM; port-4000; queue-3; action-{forward via physical port 10}

In the above example including {#a, #b, #c, #f, #g, #h, #i}, the term 'queue' in each {#a, #b, #c, #d, #e, #f, #g, #h, #i} may represent the physical queue (e.g., stored in a data structure or storage unit) on the device and have limited bandwidth. For example, queue-1 may have a bandwidth of 20 megabytes per second (MBPS); queue-2 may have a bandwidth of 50 MBPS and queue-3 may have a bandwidth of 100 MBPS, that may be assigned or configurable from end user. In an embodiment, based on the dynamic behavior of the network traffic at a specific time instance, the categorization of queries (e.g., by back-end query classifier) may be changed. For example, for user-1 the query x_1 may now dynamically change to y_3; and for user-3, the query y_2 may dynamically change to z_6, and so on. Such dynamic change in network traffic may result in user-1 may not have any queries classified as L1 queries and user-3 may not have any queries classified L2 queries. Based on this information, the controllers may remove the flow entries {#a and #e, as shown above} from all the devices (e.g., SDN LAN controller, SDN WAN controller, query table, etc.). The devices may only include information related to {#b, #c, #d, #f, #g, #h, #i}. For instance, consider user-2 has not triggered any requests or queries over a predetermined period of time. Upon detecting such a scenario, the controllers may also remove the flow entries of queries {#d and #f}, which may reduce the total set of flow entries of queries to {#b, #f, #g, #h, #i}. This information of the reduced flow entries of queries may be updated in the query table by the back-end query classifier. The above queries may be forwarded via physical port number 10, that may correspond to a gateway port number. In an embodiment, the information related to the queries may be updated to query table and subsequently this updated information may be propagated to all the devices in the cloud computing network. Such dynamic adaptation (e.g., based on users logging in, logging off, triggering requests or queries) and updating of information based on the network traffic or density of the queries, may improve efficiency and utilization of memory.

Figure 6:
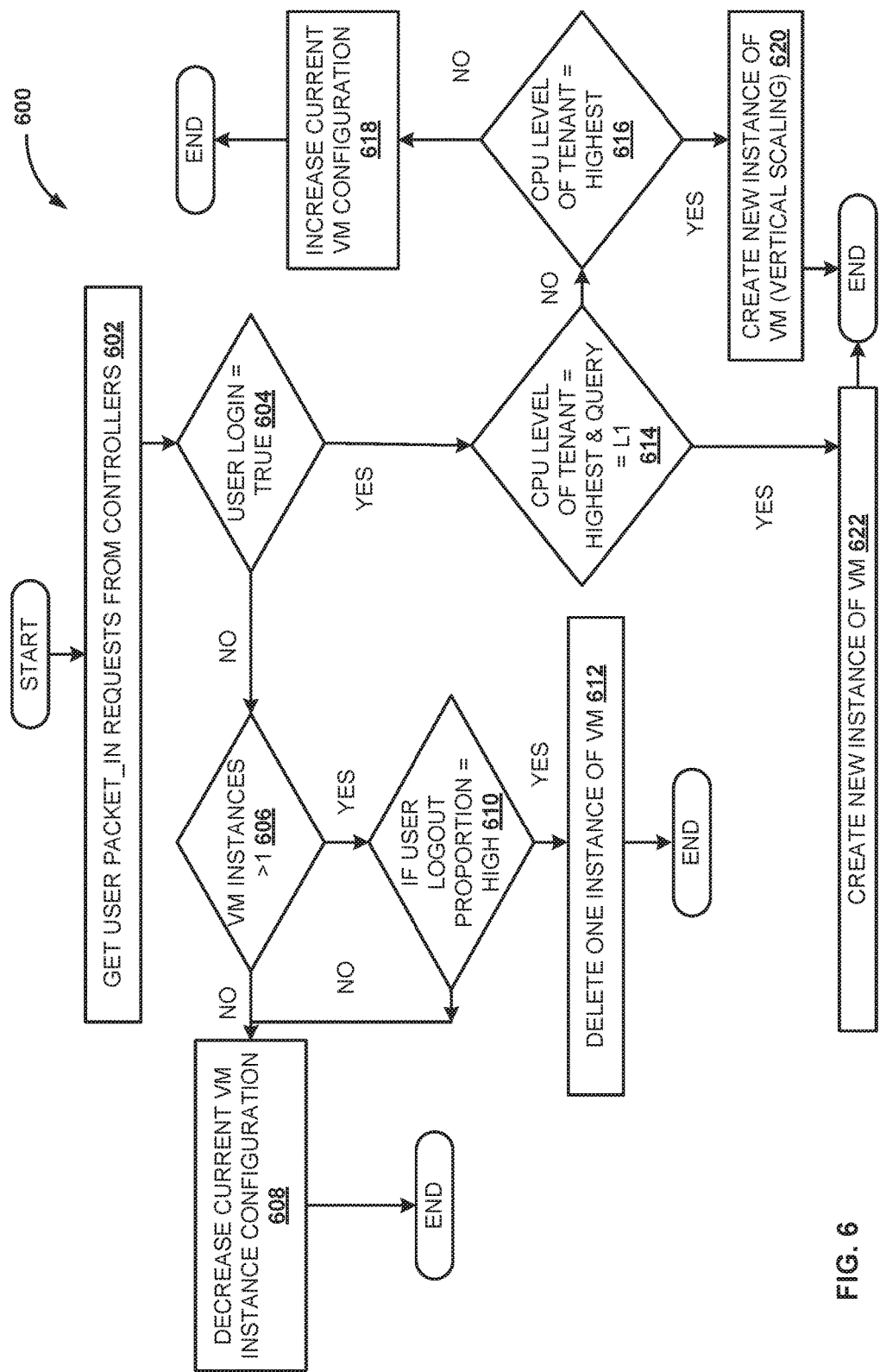
FIG. 6 is a flow diagram illustrating a process to optimize of an allocation of virtual machines, according to an embodiment.

FIG. 6 is a flow diagram illustrating process 600 to optimize of an allocation of virtual machines, according to an embodiment. In an embodiment, the virtual machine optimizer may be executed on a cloud virtual machine hypervisor and performs allocation of virtual machines, also referred to as instances of virtual machines. The cloud virtual machine hypervisor may correspond to a software routine for monitoring virtual machines. In an embodiment, the cloud virtual machine hypervisor may provide an abstraction between operating system and an underlying hardware. Such an abstraction provides an arrangement for using the computing resources such as, processors, memory, network bandwidth, etc., by multiple instances of virtual machines.

In an embodiment, the virtual machine optimizer engine may allocate computing resources or virtual machines based on available network bandwidth, network traffic. etc. The virtual machine optimizer engine may generate an estimate of the throughput or queries triggered (e.g., for each level of queries including L1, L2, L3, etc.) based on the cluster of queries as triggered by the user. In an embodiment, the virtual machine optimizer may receive the user traffic statistics which may include user login information (e.g., when the users first logs into tenants using LAN or WAN; user login =true 604) or when the user logs off from the tenants (e.g., when the queries are removed from Open Flow device). When the users log off from the tenants (e.g., NO from 604), the virtual machine optimizer may determine whether the allocated virtual machine or VM instance is greater than a predetermine value. For example, the virtual machine optimizer engine may evaluate if VM instance >1. In an embodiment, a VM instance may correspond to an instance of virtual machine or computing resources that is allocated for the determined network traffic. If not (e.g., NO from 606), the current VM instance configuration is decreased to the next lower level (e.g., decrease current VM instance configuration 608).

In an embodiment, when the VM instance is greater than the predefined threshold, for example, greater than 1 (e.g., YES from 606), the virtual machine optimizer may determine whether multiple users have logged off the tenants (e.g., if user logout proportion=high 610), and may either delete (e.g., YES from 610; delete one instance of VM 612) or decrease (e.g., NO from 610; decrease current VM instance configuration 608) the VM instance the next lower level. For example, if number of VM instances are 3, the virtual machine optimizer may decrease the VM instance to 2, when NO from 610. In an embodiment, the deletion of the VM instance may correspond to shut down of the VM and decreasing the current VM instance configuration may correspond to decreasing the allocated physical resources, such as CPUS, memory, processors, etc. In an embodiment, when the virtual machine optimizer determines that the users have logged onto the tenants (e.g., YES from 604), and the CPU utilization level of the tenants is highest and the query level is L1 (e.g., CPU level of tenant=highest & Query=L1 614; and YES from 614), the virtual machine optimizer engine may create a new instance of VM (e.g., create new instance of VM 622). In an embodiment, the average value of CPU utilization may be approximately about 60% to 70%. The VM hypervisor may be configured to determine CPU utilization and memory utilization of each VM.

In an embodiment, when the determination in 614 is NO, the virtual machine optimizer engine may determine if the CPU utilization level of the tenant is the optimally higher or highest (e.g., CPU level of tenant=highest 616). When the determination in 616 is YES, the virtual machine optimizer engine may create a new instance of the VM (e.g., create a new instance of VM 620). Such a creation of the new instance of VM may also be referred to as vertical scaling. When the determination in 614 is NO, the virtual machine optimizer may increase the current VM configuration to next higher level (e.g., increase current VM configuration 618). For example, if the current VM configuration level or VM instance is 2, then the VM configuration or VM instance level is increased to 3.

In an embodiment, the virtual machine optimizer may compute an estimate of, for example, an increase or decrease in the network traffic, independently for each level of L1, L2 and L3 queries. A standard deviation in the network traffic may be computed and compared with the computed estimate of the network traffic for each level of L1, L2 and L3 queries. In an embodiment, a positive deviation in the estimate may be determined when the computed estimate is higher than the standard deviation (e.g., an indication of higher network traffic). A negative deviation in the estimate may be determined when the computed estimate is lower than the standard deviation (e.g., an indication of lower network traffic). For example, when the users log off the tenants, there may be a significant decrease in the network traffic.

In an embodiment, when the positive deviation is determined, the virtual machine optimizer engine may determine the CPU utilization level of the tenant. When the virtual machine optimizer determines that the CPU utilization level is optimally high (e.g., 90% CPU utilization or more) and the computed positive deviation in network traffic is because of L1 queries, the virtual machine optimizer may create a new instance of VM (e.g., as explained previously 614). In an embodiment, when the computed positive deviation in the network traffic is because of L2 queries or L3 queries, and CPU utilization of the tenant is optimally high (e.g., 90% CPU utilization or more), the virtual machine optimizer may create a new instance of the VM (e.g., 620). In an embodiment, the virtual machine optimizer engine may reconfigure the allocation of VMs to the tenants based on the network traffic prediction.

In an embodiment, reconfiguring the tenant (e.g., allocation of VM, allocation of other computing resources like CPU, memory, etc., to the tenants) may be as per service level agreement (SLA). In an embodiment, when the network traffic decreases (e.g., on account of users logging off from tenants, etc.), the allocation of VM or instances of VM may be reduced. In an embodiment, when a significant decrease in network traffic is determined by the virtual machine optimizer engine, the instances of VM may be deleted. When the virtual machine optimizer determines that the current CPU utilization is below the defined threshold, the virtual machine optimizer engine may delete the VM instance (e.g., in case of vertical scaling). In an embodiment, the allocation or deletion of VM instances or VM may be based on attributes. The back-end query classifier may monitor and modify the classification of the queries dynamically in real-time based on the load attributes associated with the network traffic or data. Based on the dynamic real-time monitoring of the load attributes, the allocation of VM or instances of VM may be controlled.

FIG. 7 is an illustration of a data structure (e.g., a query table) including information related to queries, according to an embodiment. FIG. 7 shows a data structure (e.g., a table, a flat file, etc.) that stores information related to the queries. In an embodiment, the data structure in FIG. 7 may also be referred to as the query table. The query table includes information stored in matrix of rows and columns. In an embodiment, the information stored in the query table may include user id—is 702, classification of queries (e.g., L1-query 704, L2-query 706, L3-query 708, etc.), tenant—public interact protocol (IP) 710 address, user—public IP address 712, etc. The IP addresses 710 and 712 may be used for classification and routing of the queries. In an embodiment, public IP may correspond to the IP address of the tenant which is visible from outside network, while tenant IP may correspond to the local IP address assigned to the tenant within the data center.

Figure 8:
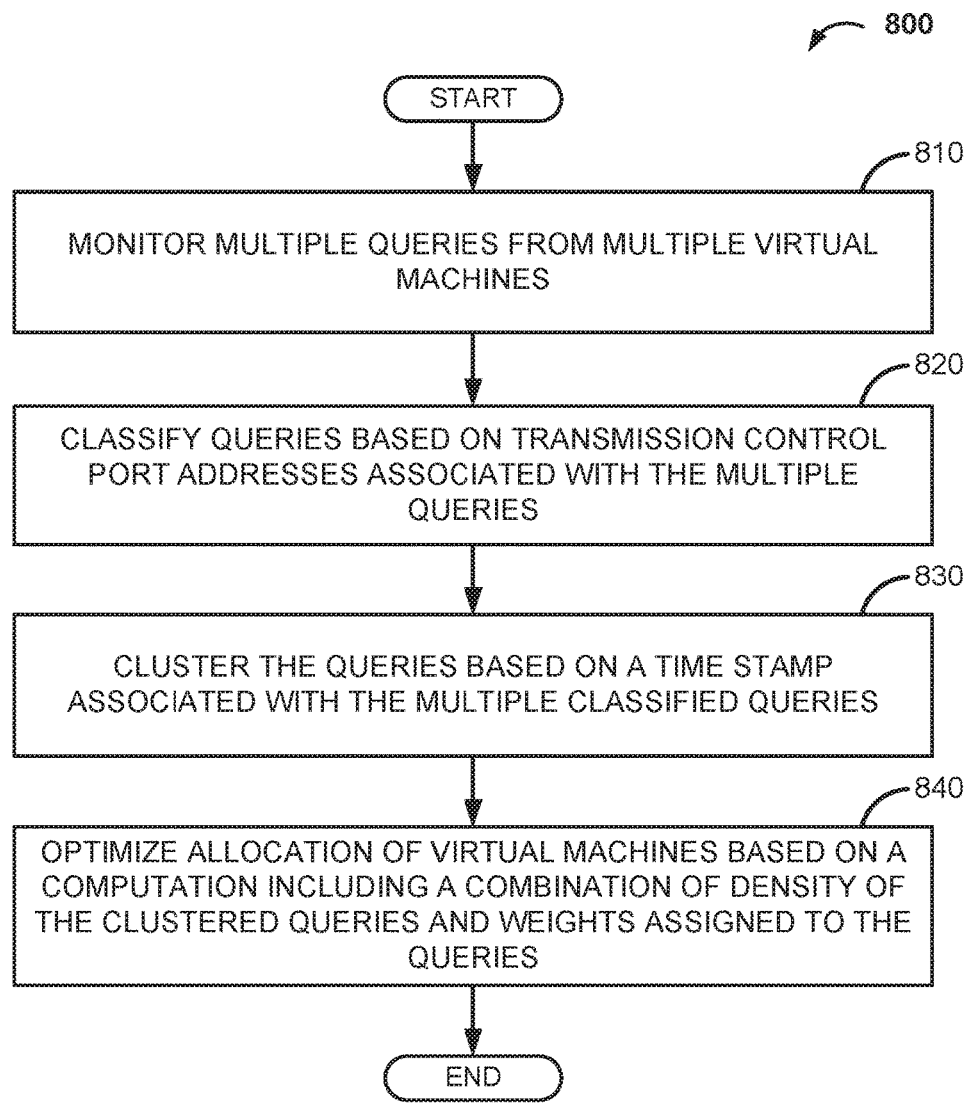
FIG. 8 is a flow diagram illustrating a process to dynamically optimize allocation of virtual machines, according to an embodiment.

FIG. 8 is a flow diagram illustrating process 800 to dynamically optimize allocation of virtual machines, according to an embodiment. FIG. 8 shows a mechanism to optimize allocation of virtual machines in a SDN. In an embodiment, a virtual machine optimizer engine may work cooperatively with components, for example, a front-end query classifier, a back-end query classifier, a SDN LAN controller, a SDN WAN controller, a data center controller, etc., to optimize the allocation of virtual machine or computing resources (e.g., CPUs, memory, processors, etc.). The cooperation between the components and the respective functional efficacies are as explained above with respect to FIG. 3.

In an embodiment, multiple queries from multiple virtual machines (e.g., tenants) are monitored, at 810 (e.g., as explained previously with reference to front-end query classifier). The queries may be triggered by users operating the tenants to execute an operation or a task. Based on the TCP addresses associated with the queries, the queries are classified, at 820 (e.g., as explained previously with reference to back-end query classifier). For example, the queries may be classified into categories L1, L2, L3, etc. Based on a time stamp associated with the queries, the queries are clustered, at 830 (e.g., as explained previously with reference to query clustering engine). Based on a computation of a combination of density of clustered queries and weights assigned to the queries, an allocation of virtual machines is optimized, at 840 (e.g., as explained previously with reference to optimizing allocation of VM or VM instances or computing resources). The density of clustered queries and weights assigned to the queries may be dynamically modified based on attributes of user traffic (e.g., load attributes). The back-end query classifier may dynamically modify the classification of queries based on the load attributes and the dynamic change in user behavior, while monitoring the network traffic.

In an embodiment, a user site network controller (e.g., SDN LAN controller) engine deployed on the tenants may monitor the network traffic or the user traffic statistics locally. The monitoring operation may be triggered when central processing unit utilization level of tenants or virtual machines in the cloud computing environment is greater than a predefined threshold. In an embodiment, an internet network controller (e.g., SDN WAN controller) in cooperation with the user site network controller may monitor the network traffic or the user traffic statistics over the WAN. For example, when the users log on to the cloud computing environment externally (e.g., outside LAN), the internet network controller may monitor the user traffic statistics and report the monitored information to the virtual machine optimizer.

In an embodiment, the dynamic allocation of virtual machines or computing resources by the virtual machine optimizer engine may effectively improve utility of cloud computing services. For instance, at least one of the techniques for optimizing an allocation of virtual machines or computing resources in the cloud computing environment may dynamically scale up or scale down the allocation of virtual machines or instances of virtual machines or the computing resources, thereby improving the utilization of resources. The cooperative working between the components in the SDN provides seamless integration of systems and dynamically allocate computing resources by adapting to load attributes in real-time by capturing user behavior in cloud computing system. In an embodiment, such allocation of the virtual machines or computing resources may optimally comply with service level agreements (SLAs) between consumers and the service providers. The cooperative working between the controllers (e.g., SDN WAN controller, SDN LAN controller, data center controller, etc.) in the SDN, may dynamically provision computing resources based on the computations and analytics of the network traffic. Such computations and analytics may provide reduced load on the data center controllers by effectively allocating TCAM memory for OF devices at data centers. The TCAM memory may refer to main memory of OF device, such as a OF enabled network switch or router.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a compute readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
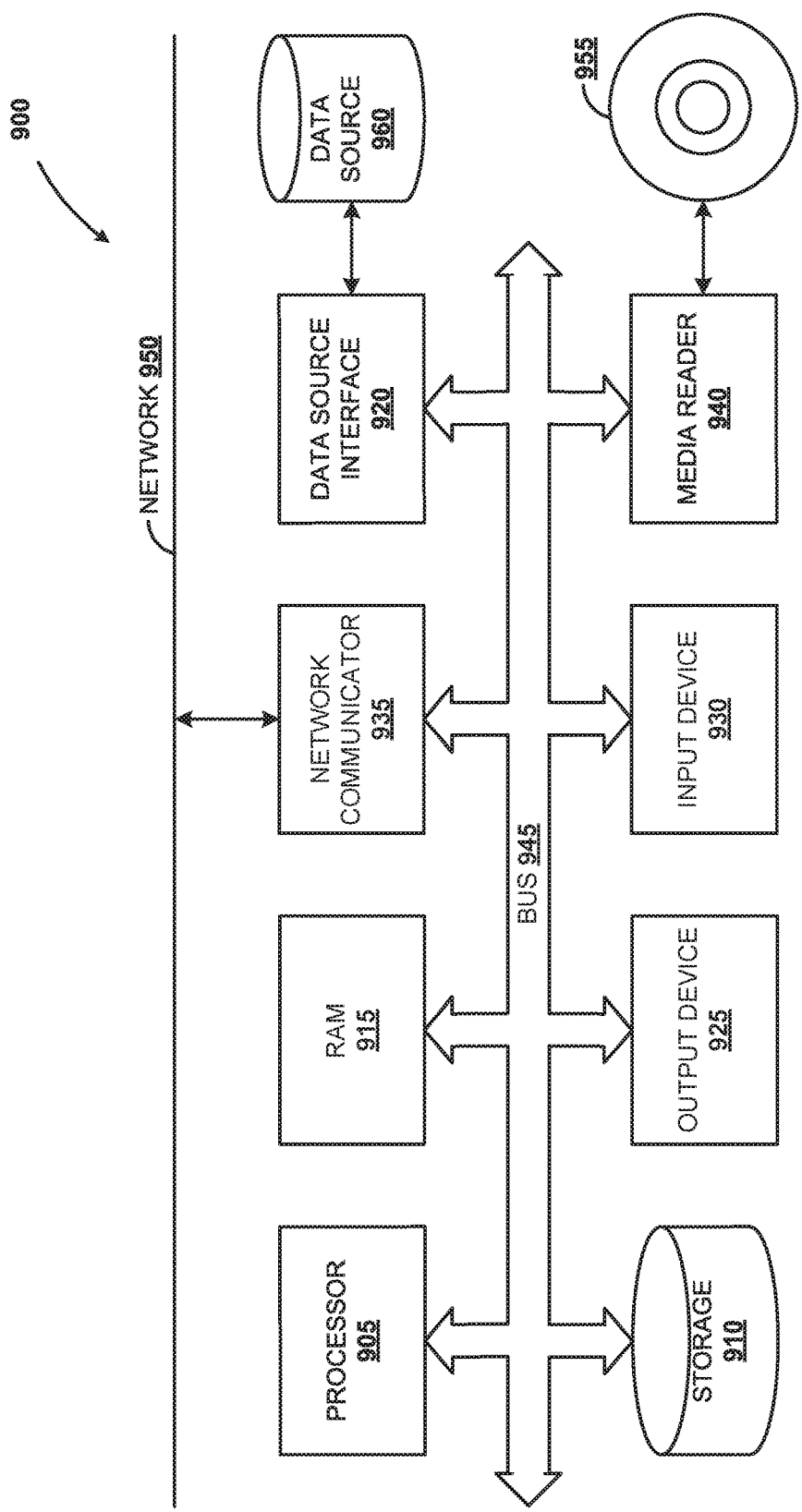
FIG. 9 is a block diagram of a computer system, according to an embodiment.

FIG. 9 is a block diagram of an exemplary computer system 900, according to an embodiment. Computer system 900 includes processor 905 that executes software instructions or code stored on computer readable storage medium 955 to perform the above-illustrated methods. Processor 905 can include a plurality of cores. Computer system 900 includes media reader 940 to read the instructions from computer readable storage medium 955 and store the instructions in storage 910 or in random access memory (RAM) 915. Storage 910 provides a large space for keeping static data where at least some instructions could be stored for later execution. According to some embodiments, such as some in-memory computing system embodiments, RAM 915 can have sufficient storage capacity to store much of the data required for processing in RAM 915 instead of in storage 910. In some embodiments, all of the data required for processing may be stored in RAM 915. The stored instructions may be further compiled to generate other representations of the instructions and dynamically stored in RAM 915. Processor 405 reads instructions from RAM 915 and performs actions as instructed. According to one embodiment, computer system 900 further includes output device 925 (e.g., a display) to provide at least some of the results of the execution as output including, but not limited to, visual information to users and input device 930 to provide a user or another device with means for entering data and/or otherwise interact with computer system 900. Each of these output devices 925 and input devices 930 could be joined by one or more additional peripherals to further expand the capabilities of computer system 900. Network communicator 935 may be provided to connect computer system 900 to network 950 and in turn to other devices connected to network 950 including other clients, servers, data stores, and interfaces, for instance. The modules of computer system 900 are interconnected via bus 945. Computer system 900 includes a data source interface 920 to access data source 960. Data source 960 can be accessed via one or more abstraction layers implemented in hardware or software. For example, data source 960 may be accessed by network 950. In some embodiments data source 960 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data. Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A system comprising:
    a memory to store computer instructions; and
    a processor communicatively coupled with the memory to execute the computer instructions to:
        monitor a plurality of queries from at least two virtual machines;
        classify at least two queries from the plurality of queries based on one or more transmission control port addresses associated with the plurality of queries;
        cluster the at least two queries from the plurality of queries based on time stamps associated with the classified at least two queries;
        optimize an allocation of the at least two virtual machines in a software defined network based on a computation including a combination of a density of the clustered at least two queries and weights assigned to the at least two queries; and
        allocate the at least two virtual machines according to the optimized allocation.

2. The system of claim 1, further comprising:
    a user site network controller to monitor a plurality of statistics in response to a central processing unit utilization by the plurality of virtual machines being greater than a predefined threshold value;
    an interact network controller to monitor the plurality of statistics associated with the monitoring of the plurality of queries; and
    a data center network controller to monitor and optimize a routing of the plurality of queries to a plurality of queues based on user credentials.

3. The system of claim 1, wherein the classification of the at least two queries is further based, at least in part, on:
    retrieval of a list of users triggering the at least two queries and validation of the at least two queries based on user access credentials by a user access validation engine;
    in response to the validation, determination of a type of the at least two queries;
    in response to the determination of the type of the at least two queries, evaluation of the at least two queries;
    based on the evaluation, classification of the at least two queries into a corresponding category from a plurality of categories.

4. The system of claim 3, wherein the evaluation of the at least two queries is based on a determination of at least one of:
    one or more documents exceeding a first threshold value associated with a number of documents;
    one or more references exceeding a first threshold value associated with a number of references;
    one or more outputs responsive to execution of the at least two queries;
    one or more documents exceeding a second threshold value associated with a number of documents; and
    one or more references exceeding a second threshold value associated with a number of references.

5. The system of claim 3, wherein the corresponding category from the plurality of categories comprises at least one of a level 1 (L1), a level 2 (L2), and a level 3 (L3).

6. The system of claim 1, wherein the processor is further to execute the computer instructions to, in response to classifying the at least two queries, generate a query table including an information related to the classification of the at least two queries.

7. The system of claim 6, wherein the processor is further to execute the computer instructions to, in response to the weight assigned to the at least two queries being modified, update the query table to propagate the modification.

8. A non-transitory computer readable storage medium tangibly storing instructions, which are executable by a computer to:
    monitor a plurality of queries from at least two virtual machines;
    classify at least two queries from the plurality of queries based on one or more transmission control port addresses associated with the plurality of queries;
    cluster the at least two queries from the plurality of queries based on time stamps associated with the classified at least two queries;
    optimize an allocation of the at least two virtual machines in a software defined network based on a computation including a combination of a density of the clustered at least two queries and weights assigned to the at least two queries; and
    allocate the at least two virtual machines according to the optimized allocation.

9. The non-transitory computer readable storage medium of claim 8, wherein the instructions are further executable by the computer to:

monitor a plurality of statistics in response to a central processing unit utilization by the at least two virtual machines being greater than a predefined threshold value;

monitor the plurality of statistics associated with the monitoring of the plurality of queries; and monitor and optimize a routing of the plurality of queries to a plurality of queues based on user credentials.

10. The non-transitory computer readable storage medium of claim 8, wherein classification of the at least two queries, further comprises:

retrieval of a list of users triggering the at least two queries and validation of the at least two queries based on user access credentials by a user access validation engine;

in response to the validation, determination of a type of the at least two queries;

in response to the determination of the type, evaluation of the at least two queries;

based on the evaluation, classification of the at least two queries into a corresponding category from a plurality of categories.

11. The non-transitory computer readable storage medium of claim 10, wherein the evaluation of the at least two queries is based on a determination of at least one of:

one or more documents exceeding a first threshold value associated with a number of documents;

one or more references exceeding a first threshold value associated with a number of references;

one or more outputs in response to execution of the at least two queries;

one or more documents exceeding a second threshold value associated with a number of documents; and one or more references exceeding a second threshold value associated with a number of references.

12. The non-transitory computer readable storage medium of claim 10, wherein the corresponding category from the plurality of categories comprises at least one of a level 1 (L1), a level 2 (L2), and a level 3 (L3).

13. The non-transitory computer readable storage medium of claim 8, wherein the instructions are further executable by the computer to: in response to the classification of the at least two queries, generate a query table including an information related to the classification of the at least two queries.

14. The non-transitory computer readable storage medium of claim 13, wherein the instructions are further executable by the computer to: in response to the weight assigned to at least two queries being modified, update the query table to propagate the modification.

15. A computer implemented method comprising:

monitoring a plurality of queries from at least two virtual machines;

classifying at least two queries from the plurality of queries based on one or more transmission control port addresses associated with the plurality of queries;

clustering the at least two queries from the plurality of queries based on time stamps associated with the classified at least two queries;

optimizing an allocation of the at least two virtual machines in a software defined network based on a computation including a combination of a density of the clustered at least two queries and weights assigned to the at least two queries; and allocating the at least two virtual machines according to the optimized allocation.

16. The computer implemented method of claim 15, further comprising:

monitoring a plurality of statistics when a central processing unit utilization by the plurality of virtual machines is greater than a predefined threshold value;

monitoring the plurality of statistics associated with the monitoring of the plurality of queries; and monitoring and optimizing a routing of the plurality of queries to a plurality of queues based on user credentials.

17. The computer implemented method of claim 15, wherein classifying the at least two queries further comprises:

retrieving a list of users triggering the at least two queries and validating the at least two queries based on user access credentials by a user access validation engine;

in response to the validating, determining a type of the at least two queries;

in response to the determining of the type, evaluating Whether the at least two queries is based on a determination of at least one of:

one or more documents exceeding a first threshold value associated with a number of documents;

one or more references exceeding a first threshold value associated with a number of references;

one or more outputs in response to execution of the at least two queries;

one or more documents exceeding a second threshold value associated with a number of documents; and one or more references exceeding a second threshold value associated with a number of references; and based on the evaluating, classifying the at least two queries into a category from a plurality of categories.

18. The computer implemented method of claim 17, wherein the corresponding category from the plurality of categories comprises at least one of a level 1 (L1), a level 2 (L2), and a level 3 (L3).

19. The computer implemented method of claim 15, further comprising: in response to classifying the at least two queries, generating a query table including an information related to the classification of the at least two queries.

20. The computer implemented method of claim 19, further comprising: in response to the weight assigned to the at least two queries being modified, updating the query table to propagate the modification.

* * * * *